(12) United States Patent
Smith et al.

(10) Patent No.: US 6,504,347 B1
(45) Date of Patent: Jan. 7, 2003

(54) APPARATUS FOR SUB-REGULATING AND SENSING AN INPUT VOLTAGE WITH MINIMUM CONNECTIONS

(75) Inventors: Gregory J. Smith, Tucson, AZ (US); Francisco J. Guerrero Mercado, Landsberg am Lech (DE)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/825,158

(22) Filed: Apr. 2, 2001

(51) Int. Cl.$^7$ .................................................. G05F 5/08
(52) U.S. Cl. ........................................ 323/226; 323/303
(58) Field of Search ................................ 323/223, 226, 323/273, 281, 303

(56) References Cited

U.S. PATENT DOCUMENTS 5,880,827 A * 3/1999 Heinke ..................... 323/226

* cited by examiner

*Primary Examiner*—Jeffrey Sterrett
(74) *Attorney, Agent, or Firm*—Merchant & Gould; Joshua W. Korver

(57) ABSTRACT

An electronic circuit produces a measurement signal and a regulated power supply from a single common connection to a raw power supply signal. The electronic circuit can be used as a module in a power control circuit, such as a circuit for charging a battery cell. In an integrated circuit (IC), the electronic circuit has a single pin connection for accepting signals or connecting to elements external to the IC. The electronic circuit sub-regulates the potential at the common connection or node using a voltage regulator. The electronic circuit produces a measurement signal that corresponds to a potential of the unregulated power supply. A sense circuit measures a potential drop from the common connection to an internal node of the electronic circuit. The measurement signal corresponds to the drop in potential. The raw power supply signal can be calculated from examining the measurement signal. The measurement signal can be used by another circuit to generate one or more control signals. The control signals can then be used for applications in other circuits. One example of the application of the electronic circuit is in the charging circuit for a battery cell. The control signals can be used to regulate the rate and amount of charge delivered to the battery cell during charging.

34 Claims, 7 Drawing Sheets

APPARATUS FOR SUB-REGULATING AND SENSING AN INPUT VOLTAGE WITH MINIMUM CONNECTIONS

FIELD OF THE INVENTION

The present invention relates to the field of regulator circuits, and in particular, to a circuit that sub-regulates and senses an input voltage from a common connection point such that the circuit has a minimum number of external connections.

BACKGROUND OF THE INVENTION

An integrated circuit is usually constructed from a small chip of semiconductor material upon which active and passive components are constructed. The active and passive components are connected together to form a functioning circuit. An integrated circuit is generally encapsulated in a plastic housing (case) with pins that are accessible for connection to external electronic circuitry. Input signals are connected to the integrated circuit via selected input pins. The input signals are processed by the active and passive components that are designed to operate within a limited range of supply voltages.

Battery powered devices often employ integrated circuits to regulate the power provided by a battery cell. Regulators are often used where the input power source is unregulated or clean power is required in a noisy environment. The regulator is often contained within the integrated circuit.

As batteries discharge, the loss in power can effect portions of the integrated circuit dependant on the battery power. The integrated circuit can suffer from poor performance when the battery power decreases below a certain level. External measurement circuitry is often added to the integrated circuit in order to measure the decrease in battery power that is delivered to the integrated circuit. By compensating the operation of the integrated circuit for the decrease in delivered power, poor performance can be avoided.

Charging devices for charging batteries are also used as alternate power sources when coupled to the integrated circuit. Poor performance or a damaged battery may result from either over-charging the battery cell or charging the battery at an excessively high rate. Additional circuitry is often included to regulate the amount of charge delivered to the battery as well as the rate at which the battery is charged.

SUMMARY OF THE INVENTION

In accordance with invention, the above and other problems are solved by a method and apparatus that sub-regulates and senses an input voltage with minimum connections. The reduction in connections permits the use of the freed connections for other purposes related to the apparatus or an associated circuit, and thereby increases the utility of the apparatus and the associated circuit.

Briefly stated, an electronic circuit produces a measurement signal and a regulated power supply from a single common connection to a raw power supply signal. The electronic circuit can be used as a module in a power control circuit, such as a circuit for charging a battery cell. For -integrated circuit (IC) applications, the electronic circuit has a single pin connection for accepting signals or connecting to elements external to the IC. The electronic circuit sub-regulates the potential at the common connection or node using a voltage regulator. A control output of the voltage regulator is used to regulate the power supply. The power supply can be held at a relatively constant DC potential when compared to the raw power supply signal. To produce the measurement signal, a drop in potential from the potential at the common node is measured by a sense circuit. The measurement signal is produced as a result of the drop in potential. The measurement signal is associated with value of the raw power supply signal such that the raw power supply signal can be calculated from examining the measurement signal. The measurement signal can be used by another circuit to generate one or more control signals. The control signals can then be used for applications in other circuits. One example of the application of the electronic circuit is in the charging circuit for a battery cell. The control signals can be used to regulate the rate and amount of charge delivered to the battery cell.

In one embodiment, an apparatus is directed to generating a measurement signal and a regulated voltage supply from a raw power supply signal having a corresponding raw voltage that is provided to the apparatus through a single connection point. The apparatus includes a voltage monitor circuit that is arranged to produce a feedback signal in response to a voltage at the single connection point. A regulator circuit is arranged to produce the regulated voltage supply in response to the feedback signal and a reference signal. A sense circuit is arranged to produce the measurement signal in response to the voltage at the single connection point, wherein the measurement signal is associated with the corresponding raw voltage of the raw power supply signal such that the measurement signal and the regulated voltage supply are produced from the single connection point with minimized external connections.

In another embodiment, an apparatus is directed to providing a measurement signal to a charge control circuit that selectively delivers charge to a battery cell from an unregulated power supply through a single common input pin in response to a charge control signal. The apparatus includes a potential monitoring circuit that is arranged to produce a sense signal in response to a potential at the single common input pin. A potential regulating circuit is arranged to produce a regulated power supply in response to the potential at the single common input pin and the control signal. A sense circuit is arranged to produce a measurement signal in response to the potential at the single common input pin and a potential of the regulated power supply, wherein the measurement signal is associated with the unregulated power supply and the charge control signal is responsive to the measurement signal such that the charge control circuit delivers charge to the battery cell in response to the measurement signal.

In yet another embodiment, a method is directed to generating a measurement signal and a regulated power supply from a raw power supply signal having a corresponding raw voltage that is provided to a single port. The method includes monitoring a voltage of the regulated power supply to produce a feedback voltage, comparing the feedback voltage to a reference voltage, producing a control signal in response to the comparison of the feedback voltage to the reference voltage, producing the regulated power supply in response to the control signal, and producing the measurement signal in response to a voltage at the single port and the voltage of the regulated power supply such that the corresponding raw voltage can be determined from the measurement signal.

In still another embodiment, an apparatus is directed to producing a measurement voltage and a regulated power supply having a regulation voltage from an unregulated power supply voltage that is provided to the apparatus through a single connection, wherein a charge control circuit utilizes the measurement voltage to provide a controlled charging potential that is delivered to a battery cell. The apparatus includes a means for monitoring that monitors the regulation voltage to produce a feedback voltage. A means for comparing produces a control signal in response to a comparison between the feedback voltage to a reference voltage. A means for regulating regulates the regulation voltage in response to the control signal. A means for measuring produces the measurement voltage in response to a voltage at the single connection and the regulation voltage such that the unregulated power supply voltage can be determined from the measurement voltage.

A more complete appreciation of the present invention and its improvements can be obtained by reference to the accompanying drawings, which are briefly summarized below, to the following detail description of presently preferred embodiments of the invention, and to the appended claims.

DETAILED DESCRIPTION OF THE PREFERRED EMBODIMENT

In the following detailed description of exemplary embodiments of the invention, reference is made to the accompanied drawings, which form a part hereof, and which is shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification, and in the claims, the term "connected" means a direct electrical connection between the things that are connected, without any intermediate devices. The term "coupled" means either a direct electrical connection between the things that are connected, or an indirect connection through one or more passive or active intermediary devices. The term "circuit" means either a single component or a multiplicity of components, either active or passive, that are coupled together to provide a desired function. The terms "battery", "cell", and "battery cell" mean a single battery, a multiplicity of batteries, a rechargeable battery, or another component that is configured to operate as a power source. The terms "external component" and "external circuit" refer to a component or circuit that is external with respect to the instant exemplary circuit, integrated circuit, or electronic module. The term "internal circuit" refers to a component or circuit that is contained within the instant exemplary circuit, integrated circuit, or electronic module.

The present invention is directed to an apparatus and method for producing a power source and signal using a minimum number of components and connections in relation to a particular circuit module. Previous circuits required a greater number of components and connections than the present invention to produce a power source and a signal. The power source and signal are produced from a raw power supply signal. A raw power supply signal is an unregulated power source that may vary over a broad range of potentials depending on the source of the signal. A raw power supply signal may be used as a charging signal for a battery cell. Often, the amount of charge delivered to the battery cell is controlled for optimum charging of the battery cell. The present invention provides a regulated power source to the circuit and provides an output signal that may be used to control the charge of a battery cell while using a minimum number of components and connections.

Figure 1:
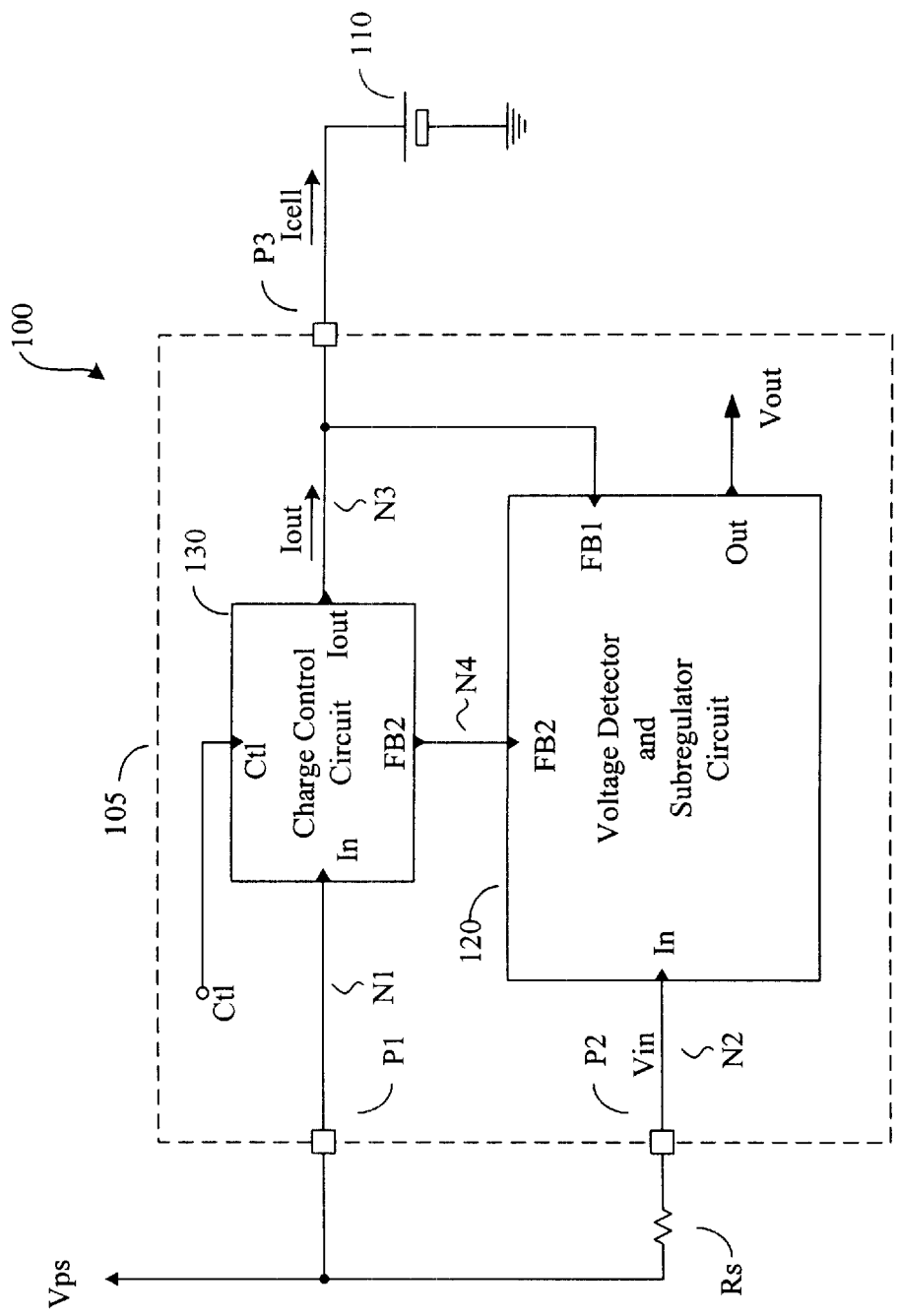
FIG. 1 illustrates an electronic circuit configured to charge a battery cell that includes a voltage detector and subregulator circuit.

FIG. 1 illustrates a circuit (100) that is in accordance with a first example of the present invention. The circuit (100) includes a battery cell (110), an input resistor (Rs), and a circuit module (105). The circuit module (105) includes a voltage detector and subregulator (VDSR) circuit (120) and a charge control circuit (130).

In one example, the circuit module (105) is an integrated circuit (IC) that utilizes a minimum number of pins in accordance with the present invention. For the sake of simplicity, circuit module (105) will be referred to as IC (105) in this example. It is appreciated that the circuit module (105) can be implemented in a number of technologies, including, but not limited to hybrid microcircuits, multi-chip modules, discrete electronic circuits, as well as others.

A raw power supply signal (Vps) is coupled to a first pin (P1) of the IC (105). The input resistor (Rs) is an external component that is coupled between the first pin (P1) and a second pin (P2) of the IC (105). A first node (N1) of the circuit (100) is coupled to the first pin (P1) of the IC (105). A second node (N2) of the circuit (100) is coupled to the second pin (P2) of the IC (105). The VDSR circuit (120) has an input port (In) that is coupled to the second node (N2), an output port (Out) that produces an output signal (Vout), a first feedback input port (FB1) that is optionally coupled to a third node (N3), and a second feedback input port (FB2) that is optionally coupled to a fourth node (N4). The charge control circuit (130) has in input port (In) that is coupled to the first node of the circuit (100), a control port (Ctl) that is coupled to a control signal (Ctl), an output port (Iout) that is coupled to the third node (N3), and a feedback output port (FB2) that is optionally coupled to the fourth node (N4). The third node (N3) is coupled to a third pin (P3) of the IC (105). The battery cell (110) is coupled to the third pin (P3) of the IC (105).

A potential at the second node (N2) corresponds to an input signal (Vin) for the VDSR circuit (120). The VDSR circuit (120) produces an output signal (Vout) in response to the input signal (Vin) and the optional signals from the feedback input ports (FB1, FB2). The VDSR circuit (120) produces an output signal (Vout) that can be used as a regulated power supply as well as a measurement signal. In this embodiment, the output signal (Vout) is used as a power supply to power internal circuitry that is present in the IC (105). The output signal (Vout) may also be used as a measurement signal used in other related circuits. In light of the above discussion, it is appreciated and understood that the VDSR circuit (110) can also produce separate outputs (i.e. a voltage supply and a measurement signal) rather than a single output with a dual purpose. It is also appreciated that the output signal (Vout) can be used to power circuits and generate control signals other than the circuits and control signals illustrated.

As previously stated, the output signal (Vout) from the VDSR circuit (120) may be used as a measurement signal to generate a control signal for other related circuits. In one embodiment, the output signal (Vout) is used by other circuitry (not shown) to generate the control signal (Ctl) for the charge control circuit (130). The charge control circuit (130) produces a controlled current (Iout) at the third node (N3), and the optional signal feedback (FB2) at the fourth node (N4) in response to the control signal (Ctl) and the raw power supply signal (Vps). The charge control circuit (130) regulates the amount of charging current (Icell) that is delivered to the battery cell (110). By regulating the controlled current (Iout), the charge control circuit (130) can change the charging current (Icell) according to conditions present in the electronic circuit (100). For example, by controlling the charging current (Icell), the charge control circuit (130) can vary the rate that charge is transferred to the battery cell (110) as the battery cell (110) charges.

In one embodiment, the output signal (Vout) is a measurement signal associated with the potential of the raw power supply signal (Vps). The VDSR circuit (120) produces the output signal (Vout) in response to a potential that is sensed at node N2. The potential at node N2 is equivalent to the raw power supply signal (Vps) when there is no potential drop across input resistor Rs. Thus, the potential of the raw power supply signal (Vps) is related to the potential at node N2 through the input resistor (Rs). The VDSR circuit (120) produces an output signal (Vout) that is responsive to the potential at node N2. In one example, a circuit (not shown) produces the control signal (Ctl) from the output signal (Vout) of the VDSR circuit (120). It is appreciated that the control signal (Ctl) can be produced internal or external of the IC (105). When the control signal (Ctl) is produced internally, it can correspond directly to the output signal (Vout). In one instance, additional circuitry can be internal to the charge control circuit (130) or the VDSR circuit (120) to produce the control signal (Ctl). In this instance, the charge control circuit (130) regulates the controlled current (Iout) in response to a control signal that is associated with the potential of the raw power supply signal (Vps). By sensing the potential of the raw power supply signal (Vps), the IC (105) ensures that charge is delivered to the battery cell (110) at a proper rate and in a proper amount.

In another embodiment, the output signal (Vout) is a measurement signal associated with the potential at the first pin (P1) of the IC (105). The potential at the first pin (P1) of the IC (105) corresponds to the power delivered to the charge control circuit (130). Thus, the output signal (Vout) is also associated with of the power delivered to the charge control circuit (130). In one example, another circuit (not shown) may be used to produce the control signal (Ctl) in response to the output signal (Vout) of the voltage detector and subregulator circuit. In this instance, the charge control circuit (130) regulates the rate and amount the battery cell (110) is charged according to the power that is delivered to the charge control circuit (130).

Other external circuitry (not shown) may be used to change or control the raw power supply signal (Vps) prior to its delivery to the pins (P1, P2) of the IC (105). In this example, the raw power supply signal (Vps) passes through the input resistor (Rs) prior to reaching the second pin (P2) of the IC (105). It is appreciated and understood that other external circuitry may also be present between the raw power supply signal (Vps) and the first and second pins (PI, P2) of the IC (105). Since the output signal (Vout) of the VDSR circuit (120) is intended to reflect the power delivered to the charge control circuit (130), then the output signal (Vout) may need to be adjusted for the introduction of external components between the raw power supply and the first pin (P1) of the IC (105). In one embodiment, the voltage detector and subregulator circuit (120) adjusts the potential of the output signal (Vout) in response to one of the optional feedback signals (FB1, FB2). In this example, the voltage detector and subregulator circuit (120) includes a correction circuit (not shown) that uses one of the optional feedback signals (FB1, FB2) to achieve an output signal (Vout) that more accurately indicates the amount of power delivered to the charge control circuit (130). It is appreciated that the correction circuit (not shown) can be an internal circuit that is included in the IC (105), or an external circuit that is outside of the IC (105).

In light of the discussion above, it is appreciated and understood that for the purposes of the present invention, the pins (P1–P3) of the IC (105) may not be necessary. The circuit module (105) may alternatively be described in terms of common nodes or connections to elements or nodes outside of the circuit module (105), rather than in terms of physical pins.

Figure 2:
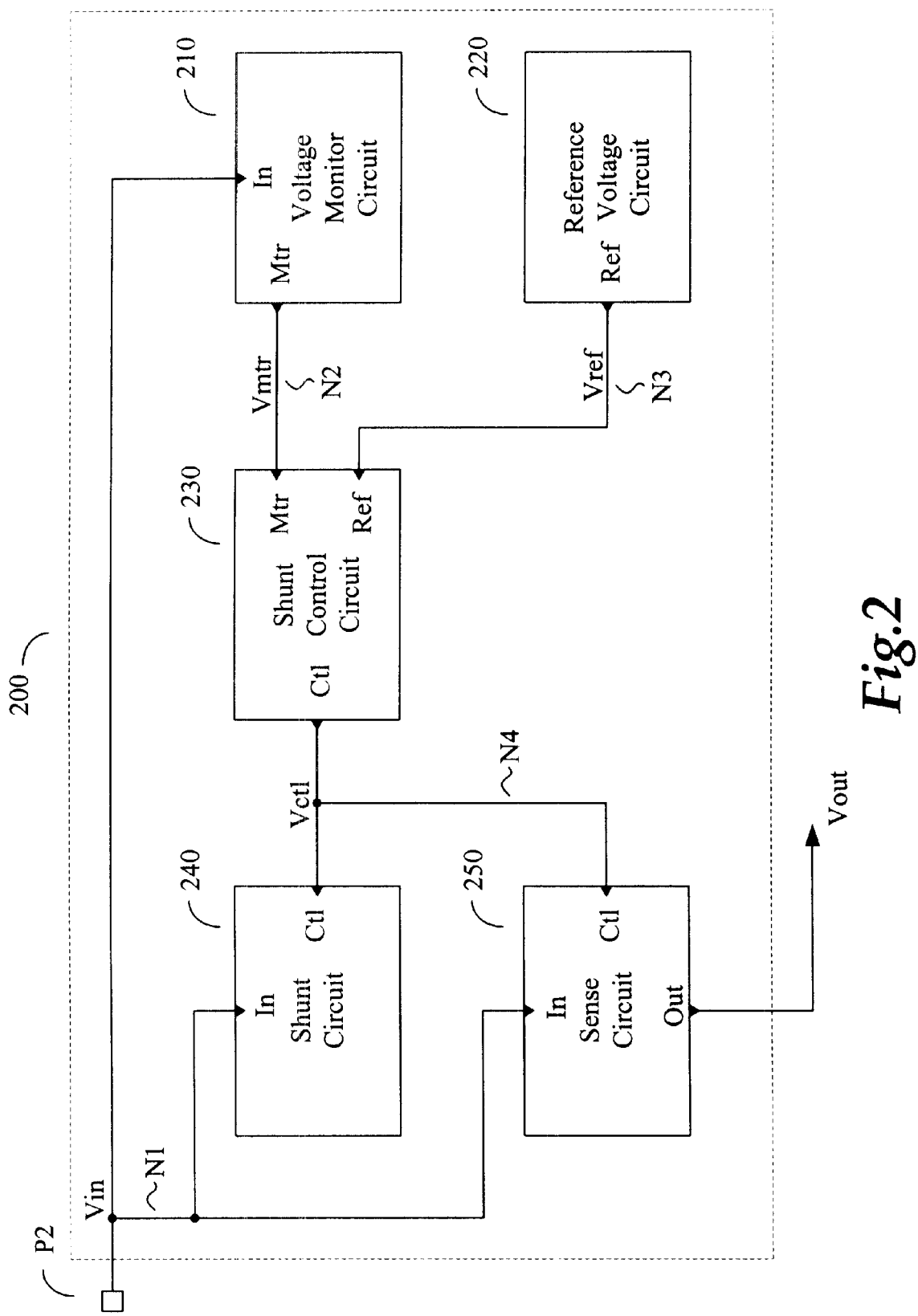
FIG. 2 illustrates an exemplary architecture for a voltage detector and subregulator circuit.

FIG. 2 illustrates an exemplary architecture for a voltage detector and subregulator (VDSR) circuit (200) in accordance with the present invention. The VDSR circuit (200) includes a voltage monitor circuit (210), a reference voltage circuit (220), a shunt control circuit (230), a shunt circuit (240), and a sense circuit (250).

An input signal (Vin) is coupled to a first node (N1) of the VDSR circuit (200). In this embodiment, the first node (N1) is coupled to the second pin (P2) of the IC (105) shown in FIG. 1. The voltage monitor circuit (210) has an input port (In) that is coupled to the first node (N1) and a monitor voltage output port (Mtr) that is coupled to a second node (N2). The reference voltage circuit (220) has a reference output port (Ref) that is coupled to a third node (N3). The shunt control circuit (230) has a monitor voltage input port (Mtr) that is coupled to the second node (N2), a reference input port (Ref) that is coupled to the third node (N3), and a control output port (Ctl) that is coupled to a fourth node (N4). The shunt circuit (240) has a control input port that is coupled to the fourth node (N4) and an input port (In) that is coupled to the first node (N1). The sense circuit (250) has a control input port (Ctl) that is coupled to the fourth node (N4), an input port (In) that is coupled to the first node (N1), and an output port (Out) that produces an output signal (Vout). It is understood and appreciated that the shunt circuit (240) and the sense circuit (250) can be combined into a single circuit.

In operation, the input signal (Vin) is received by the VDSR circuit (200) from an external source. In this embodiment, the input signal (Vin) is received through the second pin (P2) of the IC (105) shown in FIG. 1. The voltage monitor circuit (210) monitors the potential of the input signal (Vin) at the first node (N1). The voltage monitor circuit (210) produces a feedback or monitor voltage (Vmtr) at the second node (N2) in response to the potential of the input signal (Vin). The shunt control circuit (230) compares the reference voltage (Vref) to the monitor voltage (Vmtr). The reference voltage circuit (220) produces the reference voltage (Vref) at the third node (N3). It is appreciated that the reference voltage circuit (220) can be any type of circuit for generating a reference voltage potential, including but not limited to a band-gap reference circuit. The shunt control circuit (230) produces a control signal (Vctl) at the fourth node (N4) in response to the comparison of the monitor voltage (Vmtr) to the reference voltage (Vref). The shunt circuit (240) shunts the input signal (Vin) at the first node (N1) to a ground terminal (not shown) in response to the control signal (Vctl). The sense circuit (250) senses the potential of the input signal (Vin) and compares it to the potential of the control signal (Vctl). The sense circuit (250) produces an output signal (Vout) in response to the comparison of the input signal (Vin) and the control signal (Vctl).

The output signal (Vout) produced by the VDSR circuit (200) includes a measured or calculated potential that can be used as a measurement signal. The output signal (Vout) can also be used as a voltage source for providing power to other circuitry. As mentioned in relation to FIG. 1, the output signal (Vout) can be used to regulate the charge of a battery cell (120 in FIG. 1).

Figure 3:
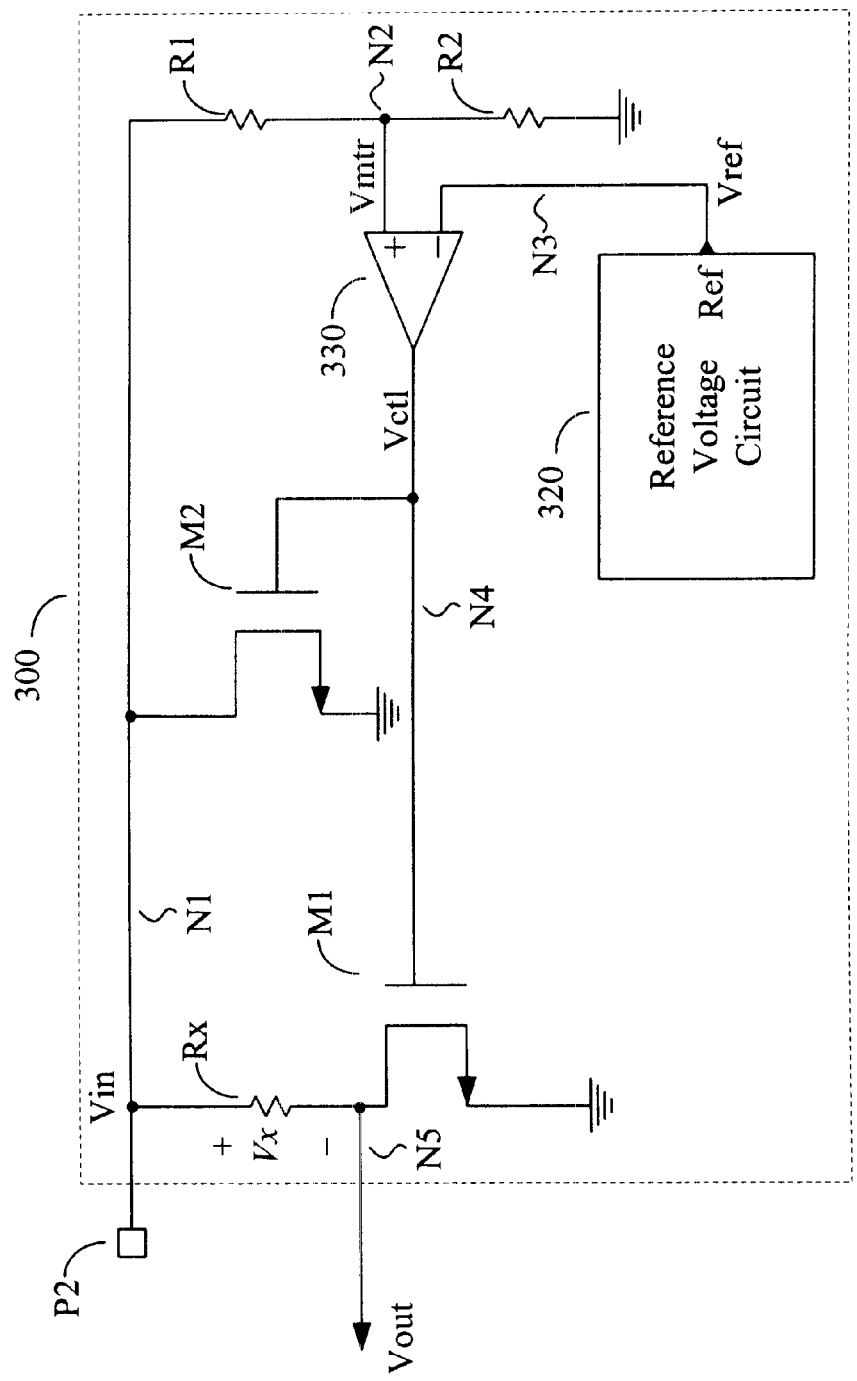
FIG. 3 illustrates a schematic diagram of an exemplary embodiment of a voltage detector and subregulator circuit.

FIG. 3 illustrates a schematic diagram of an exemplary embodiment of a voltage detector and subregulator (VDSR) circuit (300). The VDSR circuit (300) includes three resistors (R1, R2, Rx), two NMOS transistors (M1, M2), a reference voltage circuit (320), and an op-amp (330).

An input signal (Vin) is coupled to a first node (N1) of the VDSR circuit (300). The first node (N1) is coupled to the second pin (P2) of the IC (105) shown in FIG. 1. A first resistor (R1) is coupled in series between the first node (N1) and a second node (N2). A second resistor (R2) is coupled between the second node (N2) and a ground terminal (GND). The op-amp (330) has a non-inverting input terminal that is coupled to the second node (N2), an inverting input terminal that is coupled to a third node (N3), and an output terminal that is coupled to a fourth node (N4). The reference voltage circuit (320) has a reference output port (Ref) that is coupled to the third node (N3). A first NMOS transistor (M1) has a drain that is coupled to a fifth node (N5), a source coupled to GND, and a gate that is coupled the fourth node (N4). A second NMOS transistor (M2) has a drain that is coupled to the first node (N1), a source that is coupled to GND, and a gate that is coupled the fourth node (N4). A sense resistor (Rx) is coupled in series between the first node (N1) and the fifth node (N5).

The input signal (Vin) is received by the VDSR circuit (300) from an external source. In this embodiment, the input signal (Vin) is received through the second pin (P2) of the IC (105) shown in FIG. 1. The input signal (Vin) is associated with the raw power supply signal (Vps) through the external resistor (Rs) shown in FIG. 1. Other external components can be used with, or in substitution of the external resistor (Rs). The input signal (Vin) is regulated by a voltage regulator that is formed by the first resistor (R1), the second resistor (R2), the op-amp (330), and the first and second NMOS transistors (M1, M2). A voltage divider is formed by the first and second resistors (R1, R2) that monitors the potential of the input voltage (Vin) at the first node (N1), and results in a monitored voltage (Vmtr) at the second node (N2). The reference voltage circuit (320) produces a reference voltage (Vref) that is coupled to the third node (N3). The op-amp (330) produces a control signal (Vctl) at the fourth node (N4) in response to the monitor voltage (Vmtr) and the reference voltage (Vref). The op-amp (330) operates as an amplifier and attempts to equalize the potential of the monitor voltage (Vmtr) with the potential of the reference voltage (Vref). The op-amp (330) drives the gate of both NMOS transistors (M1, M2) activating the transistors. The activation of the NMOS transistors (M1, M2) results in a current that is drawn from the first node (N1) through the drain of both transistors. The voltage regulator maintains the input signal (Vin) at a DC level that is relatively constant when compared to the raw power supply signal (Vps) shown in FIG. 1. The potential of the input signal (Vin) can be described by the following first-order equation when the input signal (Vin) is less than the raw power supply signal (Vps):

$$Vin = (1 + (R1/R2)) \cdot Vref \text{ (for } Vin < Vps)$$

The input signal (Vin) remains relatively constant in spite of changes in the load current drawn from the voltage regulator or changes in the DC potential of the raw power supply signal (Vps). The regulated input signal (Vin) can be used to provide a relatively constant voltage supply for the VDSR circuit (300).

An output signal (Vout) corresponds to the potential at the fifth node (N5). As mentioned previously, when the first NMOS transistor (M1) is activated, a current is drawn from the first node (N1) through the drain of the first NMOS transistor (M1) at the fifth node (N5). This current is drawn through the sense resistor (Rx), which is coupled between the first node (Rx) and the fifth node (N5). The current drawn from the first node (N1) through the sense resistor (Rx) results in a potential drop (Vx) across the sense resistor (Rx). The output signal (Vout) is associated with the potential drop (Vx) of the sense resistor (Rx) and the input voltage (Vin). A determination can be made regarding the potential of the raw power supply signal (Vps) shown in FIG. 1 from the potential drop (Vx) across the sense resistor (Rx). The voltage (Vx) across the sense resistor (Rx) is related to the raw power supply signal (Vps) according the following equation, where Rs is the value of the external resistor (Rs) shown in FIG. 1:

$$Vx = Rx \cdot \frac{[(Vps/Rs) - Vref \cdot (1/R2 + 1/Rs + R1/(R2 \cdot Rs)]}{[(1 + W2/L2)/(W1/L1)]}$$

(for Vin<Vps), where W1/L1 corresponds to the size of M1, and

W2/L2 corresponds to the size of M2.

Since all variables in the above equation are known except Vps, the potential of Vps can be computed. The output signal (Vout) is related to the raw power supply signal (Vps) according to this equation. The output signal (Vout) can be used as a measurement signal that is associated with the potential of the raw power supply signal (Vps). For example, the output signal (Vout) can be used by a circuit (not shown) to produce the control signal (Ctl) of FIG. 1. The control signal (Ctl) is used by a charge control circuit (130) to regulate the charge rate of the battery cell (120) shown in FIG. 1. The charge rate is therefore regulated according to the potential of the raw power supply signal (Vps).

In light of the discussion above, it is appreciated and understood that the potential of the output signal (Vout) is dependant on the potential of the input signal (Vin). As the input signal (Vin) is regulated, the output signal (Vout) is also regulated. Therefore, the output signal (Vout) can also be used as a relatively constant supply voltage. The VDSR circuit (300) therefore produces a regulated supply voltage (Vin) and a measurement signal (Vout) while having a single common connection (P2) to external components. The regulated voltage supply and measurement signal can be the same signal (i.e. Vout), or separate signals (i.e. Vin that can be used for the regulated supply voltage and Vout for the measurement signal).

Figure 4:
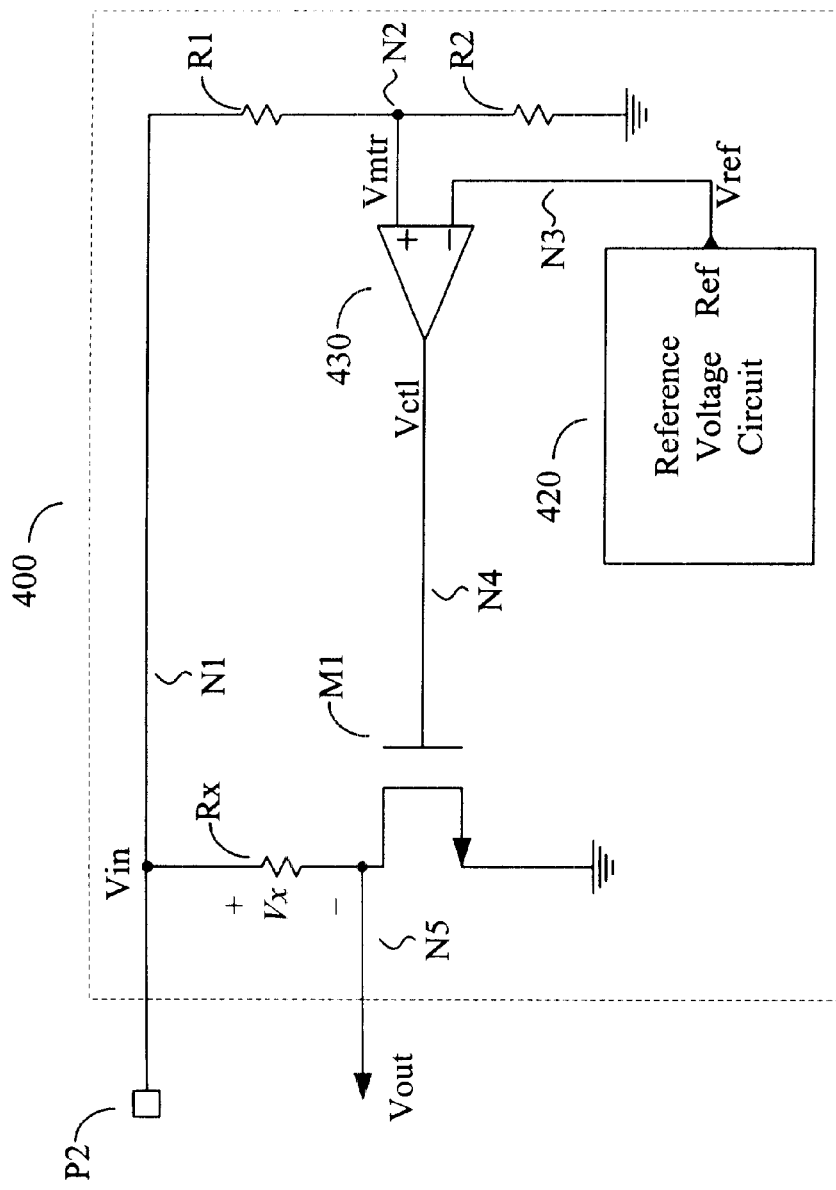
FIG. 4 illustrates a schematic diagram of another example of a voltage detector and subregulator circuit.

FIG. 4 illustrates a schematic diagram of another example of a voltage detector and subregulator (VDSR) circuit (400). The VDSR circuit (400) includes three resistors (R1, R2, Rx), an NMOS transistor (M1), a reference voltage circuit (420), and an op-amp (430).

An input signal (Vin) is coupled to a first node (N1) of the VDSR circuit (400). The first node (N1) is coupled to the second pin (P2) of the IC (105) shown in FIG. 1. A first resistor (R1) is coupled in series between the first node (N1) and a second node (N2). A second resistor (R2) is coupled between the second node (N2) and a ground terminal (GND). The op-amp (330) has a non-inverting input terminal that is coupled to the second node (N2), an inverting input terminal that is coupled to a third node (N3), and an output terminal coupled to a fourth node (N4). The reference voltage circuit (320) has a reference output port (Ref) that is coupled to the third node (N3). The NMOS transistor (M1) has a drain that is coupled to a fifth node (N5), a source that is coupled to GND, and a gate that is coupled the fourth node (N4). A sense resistor (Rx) is coupled in series between the first node (N1) and the fifth node (N5).

The VDSR circuit (400) operates similar to the VDSR circuit (300) of FIG. 3. However, the VDSR circuit (400) shown in FIG. 4 uses a single NMOS transistor (M1) rather than two NMOS transistors (M1, M2) as in FIG. 3. For the purpose of the VDSR circuit (400) in FIG. 4, the NMOS transistor (M1) may need to be increased in size as compared to the NMOS transistor (M1) of FIG. 1. By increasing the size of the NMOS transistor (M1), a greater range for the output signal (Vout) is obtained without entering into its linear region.

As in the VDSR circuit (300) of FIG. 3, the output signal (Vout) in FIG. 4 may be used as a regulated voltage supply. The output signal (Vout) is regulated by the voltage regulator that is formed by the first resistor (R1), the second resistor (R2), the op-amp (430), and the NMOS transistor (M1). The output signal (Vout) is maintained in a relationship to the raw power supply signal (Vps) as in the VDSR circuit (300) of FIG. 3. The output signal (Vout) may be used as a measurement voltage for other related circuits.

Figure 5:
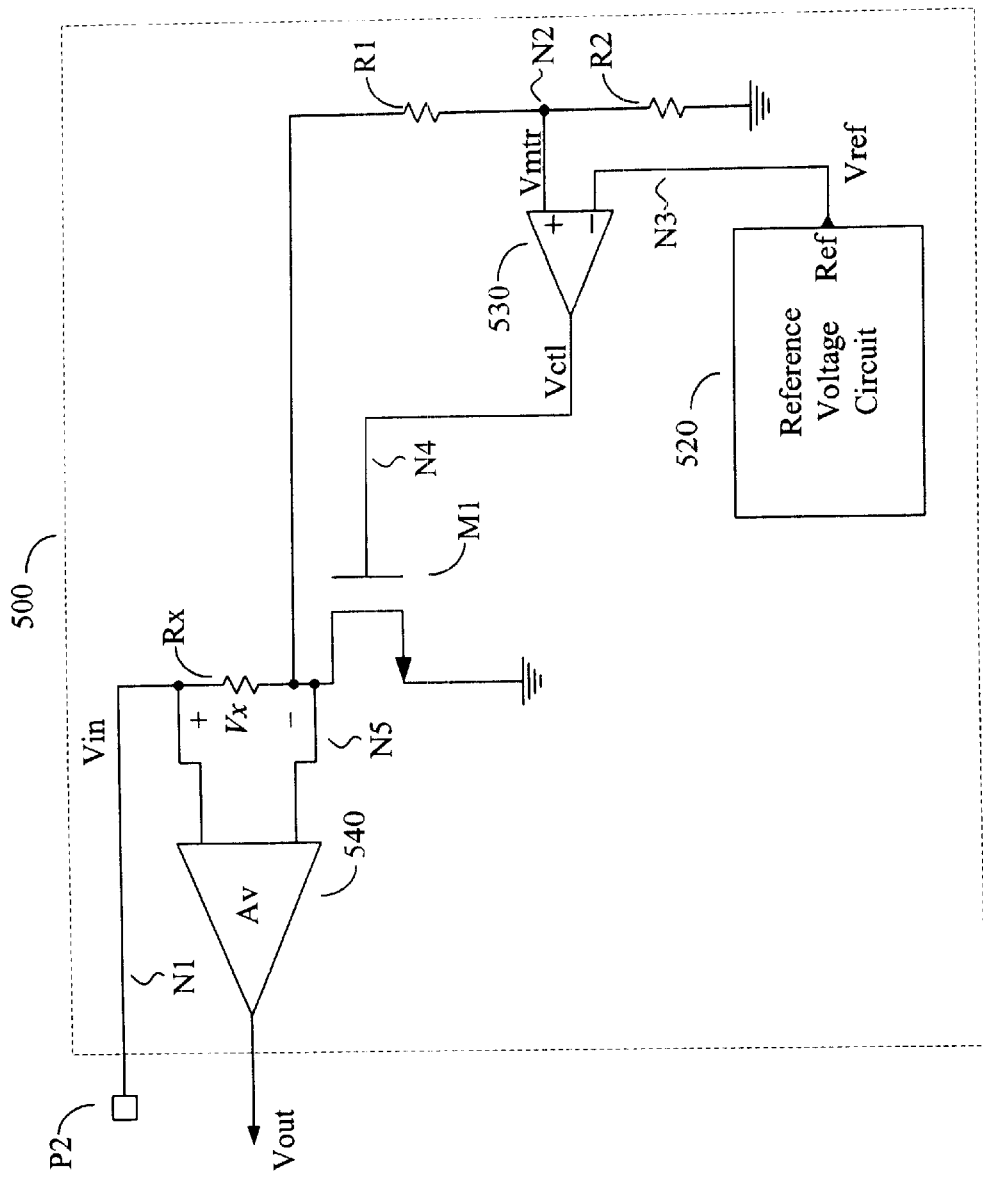
FIG. 5 illustrates a schematic diagram of yet another embodiment of a voltage detector and subregulator circuit.

FIG. 5 illustrates a schematic diagram of yet another embodiment of a voltage detector and subregulator (VDSR) circuit (500). The VDSR circuit (500) includes three resistors (R1, R2, Rx), an NMOS transistor (M1), a reference voltage circuit (520), an op-amp (530), and a voltage sense amplifier (540).

An input signal (Vin) is coupled to a first node (N1) of the VDSR circuit (500). The first node (N1) is coupled to the second pin (P2) of the IC (105) as shown in FIG. 1. A first resistor (R1) is coupled in series between a fifth node (N5) and a second node (N2). A second resistor (R2) is coupled between the second node (N2) and a ground terminal (GND). The op-amp (530) has a non-inverting input terminal that is coupled to the second node (N2), an inverting input terminal that is coupled to a third node (N3), and an output terminal coupled to a fourth node (N4). The reference voltage circuit (520) has a reference output port (Ref) that is coupled to the third node (N3). The NMOS transistor (M1) has a drain that is coupled to a fifth node (N5), a source that is coupled to GND, and a gate that is coupled the fourth node (N4). A sense resistor (Rx) is coupled in series between the first node (N1) and the fifth node (N5). The voltage sense amplifier (540) includes a first input terminal coupled to the first node (N1), a second input terminal coupled to the fifth node (N5), and an output terminal coupled to an output signal (Vout).

The VDSR circuit (500) operates similar to the VDSR circuit (400) shown in FIG. 4. As in the VDSR circuit (400) of FIG. 4, an output signal (Vout) may be used as a regulated voltage supply. The output signal (Vout) is regulated by the voltage regulator that is formed by the first resistor (R1), the second resistor (R2) the op-amp (530), and the NMOS transistor (M1), and the voltage sense amplifier (540). The output signal (Vout) is maintained in a relationship to the raw power supply signal (Vps) as in the VDSR circuit (400) of FIG. 4. The output signal (Vout) may be used as a measured voltage for other circuits.

In FIG. 5, the voltage sensor (540) is a modification circuit that operates as an amplifier that amplifies the output signal (Vout) for use in another circuit. It is appreciated that a component or circuit other than the voltage sensor (540) can be used to amplify or convert the output signal (Vout) into a signal compatible with other circuitry. For example, an analog-to-digital converter (ADC) can be used to convert the output signal (Vout) to a digital code for use in a digital circuit. It is also appreciated that the voltage sensor (540) can also be adapted for use with the VDSR circuits (300, 400) shown in FIG. 3 and FIG. 4.

The first resistor (R1) shown in FIGS. 3 and 4 is coupled to the first node (N1) at one end of the sense resistor (Rx). However, the first resistor (R1) shown in FIG. 5 is coupled to the fifth node (N5) at the opposite end of the sense resistor (Rx). Thus, the voltage divider formed by resistors R1 and R2 in FIG. 5 monitors the potential at the fifth node (N5) instead of the potential at the first node (N1) as in FIGS. 3 and 4. By monitoring the output signal (Vout) rather than the input signal (Vin), the VDSR circuit (500) regulates the output signal (Vout) rather than the input signal (Vin). In addition, the configuration in FIG. 5 avoids drawing additional current through the voltage regulator prior to sensing the potential drop (Vx) at the sense resistor (Rx). The circuit topologies in FIGS. 3 and 4 have an associated error in the potential drop (Vx) due to the current drawn by the voltage regulator from the first node (N1). The VDSR circuit (500) in FIG. 5 avoids this associated error but has the potential drop (Vx) located above the regulated potential at node N5. When compared to the example VDSR circuits shown in FIGS. 3 and 4, where the potential drop (Vx) is located below the regulated potential at node N1, the potential is an inverted signal. It is appreciated that the associated error or the inversion can be compensated for by additional circuitry.

In light of the discussion above, it is appreciated and understood that for he purpose of the circuits (200–500) shown in FIGS. 2–7, the pin (P2) shown in conjunction with each IC (205–505) may not be necessary. Each circuit module (205–505) may alternatively be described in terms of a common node or connection to elements or nodes outside of each circuit module (205–505), rather than in terms of a physical pin.

Figure 6:
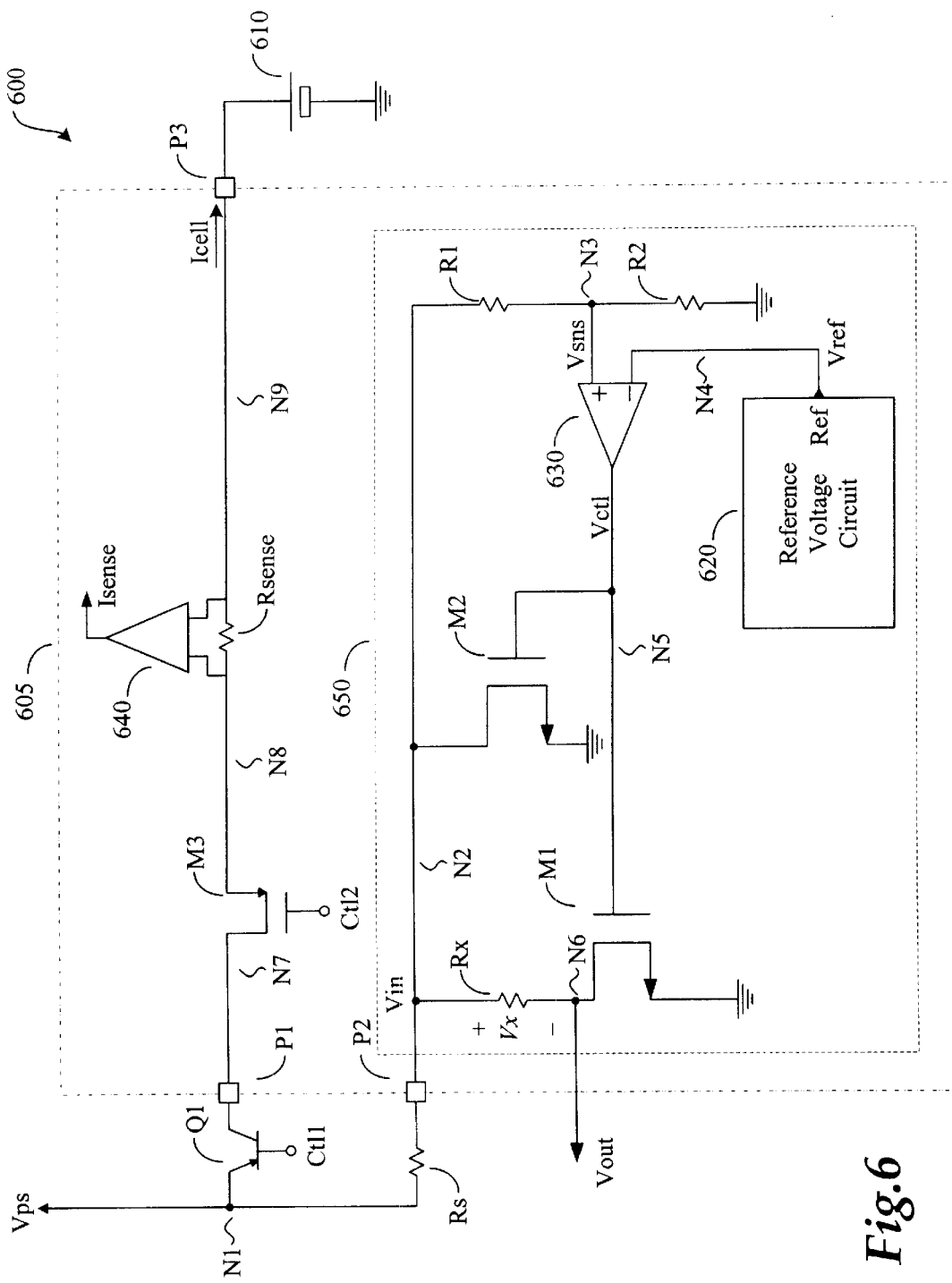
FIG. 6 illustrates an electronic circuit configured to charge a battery cell that includes a voltage detector and subregulator circuit.

FIG. 6 illustrates a circuit (600) that is in accordance with a first example of the present invention. The circuit (600) includes a battery cell (610), an external Bipolar transistor (Q1), an external resistor (Rs), and a circuit module (605).

The circuit module (605) includes a first sense resistor (Rsense), a PMOS transistor (M3), a current sense circuit (640), and a voltage detector and subregulator (VDSR) circuit (650). The VDSR circuit (650) includes three resistors (R1, R2, Rx), two NMOS transistors (M1, M2), a reference voltage circuit (620), and an op-amp (630).

In one example, the circuit module (605) is an integrated circuit (IC) that utilizes a minimum number of pins in accordance with the present invention. For the sake of simplicity, circuit module (605) will be referred to as IC (605) in this example. It is appreciated that the circuit module (605) can be implemented in a number of technologies, including, but not limited to hybrid microcircuits, multi-chip modules, discrete electronic circuits, as well as others.

A raw power supply signal (Vps) is coupled to a first node (N1) of the circuit (600). The external resistor (Rs) is an external component that is coupled between the first node (N1) and a second pin (P2) of the IC (605). The external Bipolar transistor (Q1) has an emitter that is coupled to the first node (N1), a collector that is coupled to a first pin (P1) of the IC (605), and a base that is coupled to a first control signal (Ctl1). A second node (N2) of the circuit (600) is coupled to the second pin (P2) of the IC (605). The VDSR circuit (650) is coupled to the second pin (P2) of the circuit (600) at the second node (N2).

The VDSR circuit (650) is connected similar to the VDSR circuit (300) of FIG. 3. In the VDSR circuit (650), a first resistor (R1) is coupled in series between the second node (N2) and a third node (N3). A second resistor (R2) is coupled between the third node (N3) and a ground terminal (GND). The op-amp (630) has a non-inverting input terminal that is coupled to the third node (N3), an inverting input terminal that is coupled to a fourth node (N4), and an output terminal that is coupled to a fifth node (N5). The reference voltage circuit (620) has a reference output port (Ref) that is coupled to the fourth node (N4). A first NMOS transistor (M1) has a drain that is coupled to a sixth node (N6), a source that is coupled to GND, and a gate that is coupled the fifth node (N5). A second NMOS transistor (M2) has a drain that is coupled to the second node (N2), a source that is coupled to GND, and a gate that is coupled the fifth node (N5). A second sense resistor (Rx) is coupled in series between the first node (N1) and the sixth node (N6).

In the remainder of the circuit (600), the first pin (P1) of the IC (605) is coupled to a seventh node (N7) of the circuit (600). The PMOS transistor (M3) has a drain that is coupled to the seventh node (N7), a source that is coupled to an eighth node (N8), and a gate that is coupled to a second control signal (Ctl2). The sense resistor (Rsense) is coupled in series between the eighth node (N8) and a ninth node (N9). The ninth node (N9) is coupled to a third pin (P3) of the IC (605). The current sense circuit (640) is connected across the sense resistor (Rsense) with a first input terminal that is coupled to the eighth node (N8), a second input terminal that is coupled to the ninth node (N9), and an output terminal that is coupled to a current sense signal (Isense). The battery cell (610) is coupled to the third pin (P3) of the IC (605).

A potential at the second node (N2) corresponds to an input signal (Vin) for the VDSR circuit (650). The VDSR circuit (650) operates similar to the VDSR circuit (300) of FIG. 3. The VDSR circuit (650) produces both a regulated supply voltage (Vin) and a measurement signal (Vout).

The other circuit elements including the Bipolar transistor (Q1), the PMOS transistor (M3), and the current sense circuit (640) in FIG. 6 are arranged to control the transfer of charge from the raw power supply signal (Vps) to the battery cell (610). In one embodiment, the Bipolar transistor (Q1) is arranged to operate as a controlled switch that controls the flow of current from the power supply to the IC (605). It is appreciated that the output signal (Vout) can be used by a circuit (not shown) to generate the control signal (Ctl1) for the Bipolar transistor (Q1).

In one embodiment, the current sense signal (Isense) is used by a circuit (not shown) to generate the control signal (Ctl1) for the Bipolar transistor (Q1). The current sense circuit (640) produces the current sense signal (Isense) in response to the current passing through the first sense resistor (Rsense). The current through the first sense resistor (Rsense) varies as the stored charge on the battery cell (610) increases. By using the current sense signal (Isense) to generate the control signal (Ctl1), the Bipolar transistor (Q1) limits the flow of current to the IC (600) based upon the current measured at the first sense resistor (Rsense).

In another embodiment, the control signal (Ctl1) is generated by another circuit (not shown) in response to the current sense signal (Isense) and the output signal (Vout). By using the output signal (Vout) in generating the control signal (Ctl1), the Bipolar transistor (Q1) can interrupt the power delivered to the IC (605) according to the potential of the raw power supply signal (Vps). In one example, the output signal (Vout) indicates the potential of the raw power supply signal (Vps). A fully charged battery cell (610) has an associated voltage. The current delivered to the battery cell (610) changes when the battery cell (610) reaches a full charge. The change in current is indicated by a potential drop across the first sense resistor (Rsense). The potential drop is dependant on the potential of the raw power supply signal (Vps). The output signal (Vout), by indicating the potential of the raw power supply signal (Vps), is used by other circuitry with the potential drop across the first sense resistor (Rsense) to determine when there is a full charge on the battery cell (610). The Bipolar transistor (Q1) prevents current from the raw power supply from entering the IC (600) when this potential drop across the first sense resistor (Rsense) is reached.

In light of the discussion above, it is appreciated and understood that the output signal (Vout), the current sense signal (Isense), or a combination thereof can also be used by another circuit (not shown) to generate the control signal (Ctl2) for the PMOS transistor (M3). The PMOS transistor (M3) can be used to limit the flow of current to the battery cell (610). For example, the current passing through the first sense resistor (Rsense) may indicate that the battery cell (610) is receiving charge at an incorrect rate. The PMOS transistor (M3) can adjust the rate the charge is delivered to battery cell according the potential of the output signal (Vout) and the current sense signal (Isense) as described above in relation to the Bipolar transistor (Q1).

In another embodiment, the current sense signal (Isense) or the output signal (Vout) is used to adjust the size of the current sense resistor (Rsense). By adjusting the size of the current sense resistor (Rsense) the amount of current delivered to the battery cell (610) can be adjusted. By controlling the amount of current delivered to the battery cell (610), the rate at which the battery cell (610) is charged can be adjusted.

Figure 7:
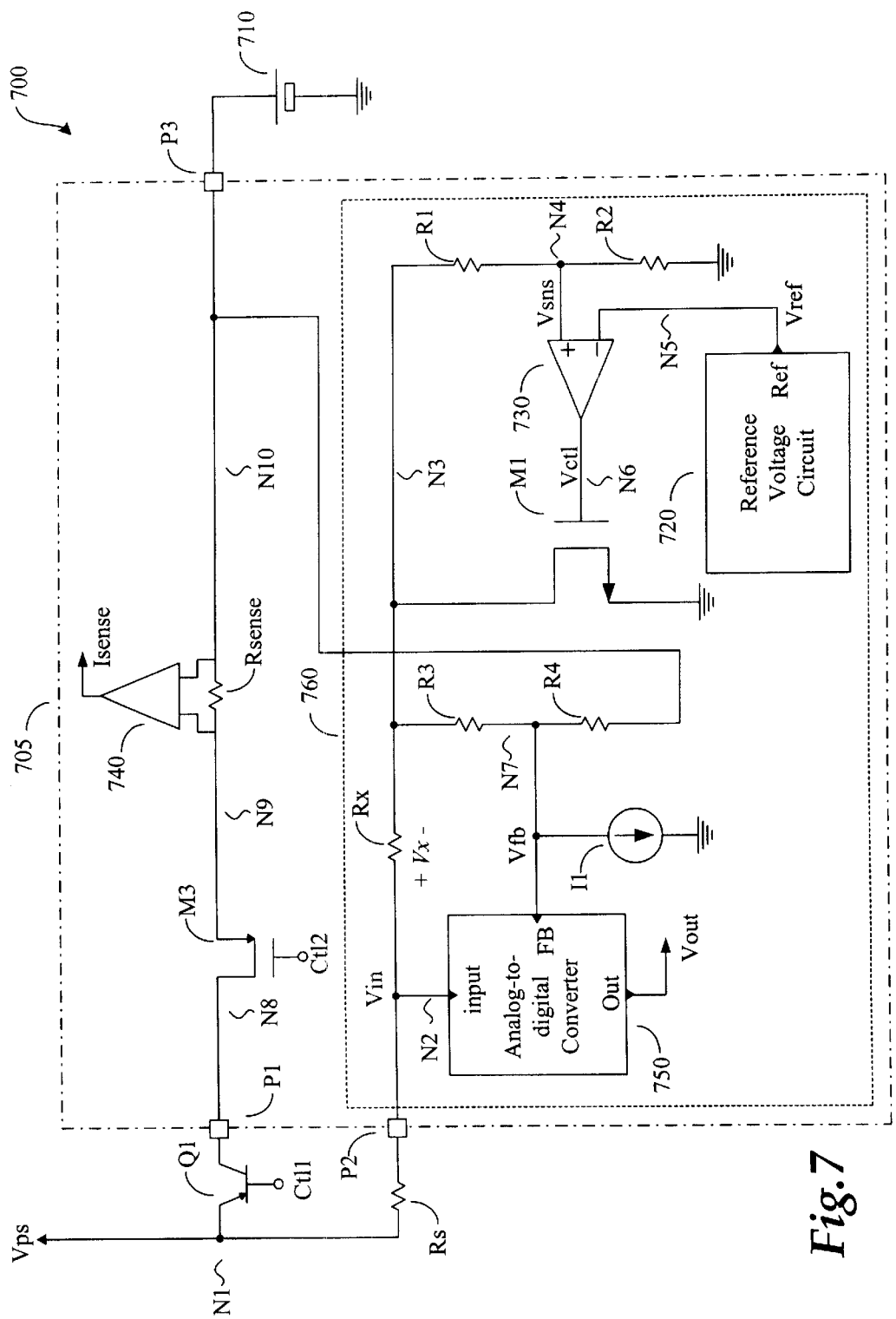
FIG. 7 illustrates an electronic circuit configured to charge a battery cell with the exemplary voltage detector and subregulator circuit that includes a correction circuit, in accordance with the present invention.

FIG. 7 illustrates a circuit (700) that is in accordance with an example of the present invention. The circuit (700) includes a battery cell (710), a BJT transistor (Q1), an external resistor (Rs), and a circuit module (705). The circuit module (605) includes a first sense resistor (Rsense), a PMOS transistor (M3), a current sense circuit (740), and a voltage detector and subregulator (VDSR) circuit (760). The VDSR circuit (760) includes five resistors (R1–R4, Rx), an NMOS transistor (M1), a reference voltage circuit (720), an op-amp (730), a current source (I1), and an analog-to-digital converter (ADC, 750).

In one example, the circuit module (705) is an integrated circuit (IC) that utilizes a minimum number of pins in accordance with the present invention. For the sake of simplicity, circuit module (705) will be referred to as IC (705) in this example. It is appreciated that the circuit module (705) can be implemented in a number of technologies, including, but not limited to hybrid microcircuits, multi-chip modules, discrete electronic circuits, as well as others.

A raw power supply signal (Vps) is coupled to a first node (N1) of the circuit (700). The external resistor (Rs) is an external component that is coupled between the first node (N1) and a second pin (P2) of the IC (705). The external Bipolar transistor (Q1) is an external component that has an emitter that is coupled to the first node (N1), a collector that is coupled to a first pin (P1) of the IC (705), and a base that is coupled to a first control signal (Ctl1). The input signal (Vin) of the VDSR circuit (760) is coupled to the second pin (P2) of the circuit (700) at a second node (N2). The battery cell (710) is an external component that is coupled to a third pin (P3) of the IC (705).

The VDSR circuit (760) is connected similar to the VDSR circuit (500) of FIG. 5 with the addition of correction circuitry. In the VDSR circuit (760), a first sense resistor (Rx) is coupled in series between the second node (N1) and a third node (N3). A first resistor (R1) is coupled in series between the third node (N3) and a fourth node (N4). A second resistor (R2) is coupled between the fourth node (N4) and a ground terminal (GND). The op-amp (730) has a non-inverting input terminal that is coupled to the fourth node (N4), an inverting input terminal that is coupled to a fifth node (N5), and an output terminal that is coupled to a sixth node (N6). The reference voltage circuit (720) has a reference output port (Ref) that is coupled to the fifth node (N5). The NMOS transistor (M1) has a drain that is coupled to the third node (N3), a source that is coupled to GND, and a gate that is coupled the sixth node (N6).

The correction circuitry includes a third resistor (R3), a fourth resistor (R4), and the current source (I1). The third resistor (R3) is coupled in series between the third node (N3) and a seventh node (N7). The fourth resistor (R4) is coupled between the seventh node (N7) and a tenth node (N10). The current source (I1) is coupled between the seventh node (N7) and GND. The ADC (750) has an input port (input) that is coupled to the second node (N2), a feedback voltage port (FB) that is coupled to the seventh node (N7), and an output port (Out) that is coupled to an output signal (Vout).

In the remainder of the IC (705), the first pin (P1) of the IC (705) is coupled to an eighth node (N8). The PMOS transistor (M3) has a drain that is coupled to the eighth node (N8) a source that is coupled to a ninth node (N9), and a gate that is coupled to a second control signal (Ctl2). The sense resistor (Rsense) is coupled in series between the ninth node (N9) and a tenth node (N10). The tenth node (N10) is coupled to a third pin (P3) of the IC (705). The current sense circuit (740) has a first input terminal that is coupled to the ninth node (N9), a second input terminal that is coupled to the tenth node (N10), and an output terminal that is coupled to a current sense signal (Isense).

A potential at the second node (N2) corresponds to an input signal (Vin) for the VDSR circuit (760). The VDSR circuit (760) operates similar to the VDSR circuit (500) shown in FIG. 5, with the addition of correction circuitry.

The circuit (700) of FIG. 7 operates similar to the circuit (600) shown in FIG. 6, with the addition of the correction circuitry. The VDSR circuit in FIG. 7 operates similarly to the VDSR circuit (500) of FIG. 5, with accommodations for the correction circuitry. The VDSR circuit (760) uses an analog-to-digital converter (ADC) in place of the voltage sense amplifier (540) shown in FIG. 5. The VDSR circuit (760) produces both a regulated supply voltage (Vin) and a measurement signal (Vout).

In this embodiment, the additional correction circuitry includes resistors R3 and R4, current source I1, and a feedback connection that corresponds to the tenth node (N10). The third resistor (R3) and the fourth resistor (R4) form a voltage divider circuit that monitors the potential at the tenth node (N10). A feedback voltage (Vfb) is established at the seventh node (N7) in response to the potentials at the third node (N3) and the tenth node (N10). The current source (I1) adjusts the potential at the seventh node (N7) by drawing current from the seventh node (N7). The correction circuitry is arranged to compensate for a difference in voltages at the first pin (P1) of the IC (705) and the second pin (P2) of the IC (705).

The potential at the seventh node (N7) corresponds to the feedback voltage (Vfb) produced by the correction circuit. The feedback voltage (Vfb) is digitized by the ADC (750). The feedback voltage (Vfb) has a potential that approximates the potential of the raw power supply signal (Vps) minus the potential at the second pin (P2) of the IC (705). The output signal (Vout) corresponds to a digitized version of the feedback voltage (Vfb). With the inclusion of the correction circuitry, the output signal (Vout) more accurately reflects the raw power supply voltage. The output signal (Vout) can be used to generate control signals (e.g. Ctl1) for regulating the elements of the circuit (700). In light of this discussion, it is appreciated and understood that another type of correction circuits can be used.

As stated previously, the tenth node (N10) serves as a feedback line to resistor R4 in the correction circuitry. It is appreciated that the feedback line may be coupled to a node other than the tenth node (N10). For example, the feedback line can be coupled to the eighth node (N8) corresponding to the fist pin (P1) of the IC (700). By coupling the feedback line to a different node, the correction circuitry may be modified to compensate. The modifications can include but are not limited to the addition or elimination of resistors (R3, R4) in the correction circuitry.

In light of the discussion above, it is appreciated and understood that for the purposes of the circuits (600, 700) in FIGS. 6 and 7, the pins (P1–P3) of the ICs (605, 705) may not be necessary. The circuit modules (605, 705) may alternatively be described in terms of common nodes or connections to elements or nodes outside of the circuit modules (605, 705), rather than in terms of physical pins.

Also, It is appreciated and understood that the transistors shown in each circuit (300–700) of FIGS. 3–7 can be a switch circuit or current limiting circuit of any type, including but not limited to BJT transistors, MOSFET transistors, GaAsFET transistors, and others.

Although the above exemplary embodiments illustrated in FIGS. 1–7 are described in terms of an integrated circuit (IC), it is understood and appreciated that the same circuit topology shown in each figure may be employed for other types electronic circuits while achieving the same results. For example, the topology described above may be adapted for hybrid microcircuits, multi-chip modules, discrete electronic circuits, as well as others. In other circuits, the common connection points may be physical pins, common connection nodes, or any other type of common connection.

The above specification, examples and data provide a complete description of the manufacture and use of the composition of the invention. Since many embodiments of the invention can be made without departing from the spirit and scope of the invention, the invention resides in the claims hereinafter appended.

We claim:

1. An apparatus for generating a measurement signal and a regulated voltage supply from a raw power supply signal having a corresponding raw voltage that is provided to the apparatus through a single connection point, comprising:
   a voltage monitor circuit that is arranged to produce a feedback signal in response to a voltage at the single connection point;
   a regulator circuit that is arranged to produce the regulated voltage supply in response to the feedback signal and a reference signal; and
   a sense circuit that is arranged to produce the measurement signal in response to the voltage at the single connection point, wherein the measurement signal is associated with the corresponding raw voltage of the raw power supply signal such that the measurement signal and the regulated voltage supply are produced from the single connection point with minimized external connections.

2. An apparatus as in claim 1, the regulator circuit further comprising an error amplifier circuit that is arranged to produce a control signal by comparing the feedback signal to the reference signal.

3. An apparatus as in claim 2, further comprising a band-gap reference circuit that is arranged to provide the reference voltage.

4. An apparatus as in claim 2, wherein the sense circuit is responsive to the control signal.

5. An apparatus as in claim 1, wherein the voltage at the single common input node corresponds to the regulated voltage supply.

6. An apparatus as in claim 1, wherein the regulator circuit further comprises a shunt circuit that is arranged in parallel with the sense circuit such that the shunt circuit regulates the voltage at the single connection point, wherein the voltage at the single connection point corresponds to the regulated voltage supply.

7. An apparatus as in claim 1, wherein the regulator circuit further comprises a shunt circuit that is coupled in series through the sense circuit to the single connection point such that the shunt circuit regulates the voltage at the single connection point, wherein the voltage at the single connection point corresponds to the regulated voltage supply.

8. An apparatus as in claim 1, wherein the regulator circuit further comprises a shunt circuit that is coupled in series to the single connection point through the sense circuit such that the such that the shunt circuit regulates a voltage at an intermediate point between the shunt circuit and the sense circuit, wherein the voltage at the intermediate point corresponds to the regulated voltage supply.

9. An apparatus as in claim 1, wherein the regulated voltage supply provides power to the voltage monitor circuit, the regulator circuit, and the sense circuit.

10. An apparatus as in claim 1, the sense circuit further comprising a sense resistor that is arranged to produce a voltage drop that is associated with the voltage at the single connection point such that the corresponding raw voltage can be determined from the voltage drop.

11. An apparatus as in claim 10, further comprising an error amplifier that is arranged to produce a control signal in response to the feedback signal and the reference signal, and the sense circuit is arranged such that the voltage drop is also responsive to the control signal.

12. An apparatus as in claim 10, wherein the regulator circuit further comprises a shunt circuit that is coupled in series through the sense resistor to the single connection point such that the shunt circuit regulates the voltage at the single connection point through the sense resistor, wherein the voltage at the single connection point corresponds to the regulated voltage supply.

13. An apparatus as in claim 10, wherein the regulator circuit further comprises a shunt circuit that is coupled in series to the single connection point through the sense resistor such that the shunt circuit regulates a voltage at an intermediate point between the shunt circuit and the sense circuit, wherein the voltage at the intermediate point corresponds to the regulated voltage supply.

14. An apparatus as in claim 10, further comprising a transistor that is arranged to draw current through the sense resistor to generate the voltage drop.

15. An apparatus as in claim 1, further comprising an amplifier that is arranged to produce an amplified signal in response to the measurement signal.

16. An apparatus as in claim 1, further comprising an analog-to-digital converter that is arranged to produce a digital signal in response to the measurement signal such that the digital signal corresponds to a digital representation of the measurement signal.

17. An apparatus for providing a measurement signal to a charge control circuit that selectively delivers charge to a battery cell from an unregulated power supply through a single common input pin in response to a charge control signal, comprising:
   a potential monitoring circuit that is arranged to produce a sense signal in response to a potential at the single common input pin;
   a potential regulating circuit that is arranged to produce a regulated power supply in response to the potential at the single common input pin and the charge control signal; and
   a sense circuit that is arranged to produce a measurement signal in response to the potential at the single common input pin and a potential of the regulated power supply, wherein the measurement signal is associated with the unregulated power supply and the charge control signal is responsive to the measurement signal such that the charge control circuit delivers charge to the battery cell in response to the measurement signal.

18. An apparatus as in claim 17, further comprising an analog-to-digital converter that is arranged to produce a digital signal in response to the measurement signal, wherein that the digital signal corresponds to a digital representation of the measurement signal and the charge control signal is responsive to the digital signal.

19. An apparatus as in claim 17, the sense circuit further comprising an amplifier circuit that is arranged to produce the measurement signal in response to a difference between the potential of the regulated power supply and the potential at the single common input pin such that the amplifier circuit amplifies the difference.

20. An apparatus as in claim 17, further comprising a correction circuit that is arranged to provide a correction factor to the measurement signal, wherein the correction factor is related to a difference between the potential at the regulated power supply and a potential corresponding to the battery cell.

21. An apparatus as in claim 20, wherein the correction circuit is arranged to provide a feedback path between the sense circuit and the battery cell.

22. An apparatus as in claim 20, the correction circuit further comprising:
- a feedback circuit that is coupled to the battery cell, the sense circuit, and the regulated voltage supply; and
- a current source that is coupled to feedback circuit such that the current source and the feedback circuit produce the difference between the potential at the regulated power supply and a potential corresponding to the battery cell.

23. An apparatus as in claim 17, the charge control circuit is arranged to control the rate and amount of charge delivered to the battery cell in response to the measurement signal.

24. A method of generating a measurement signal and a regulated power supply from a raw power supply signal having a corresponding raw voltage that is provided to a single port, comprising:
- monitoring a voltage of the regulated power supply to produce a feedback voltage;
- comparing the feedback voltage to a reference voltage;
- producing a control signal in response to the comparison of the feedback voltage to the reference voltage;
- producing the regulated power supply in response to the control signal; and
- producing the measurement signal in response to a voltage at the single port and the voltage of the regulated power supply such that the corresponding raw voltage can be determined from the measurement signal.

25. A method as in claim 24, further comprising shunting current from the regulated power supply to provide regulation of the regulated power supply in response to the control signal.

26. A method as in claim 24, further comprising converting the measurement signal to a digital signal that corresponds to a digital representation of the measurement signal.

27. A method as in claim 24, producing the measurement signal further comprising measuring a difference between the voltage at the single port and the voltage of the regulated power supply.

28. An apparatus for producing a measurement voltage and a regulated power supply having a regulation voltage from an unregulated power supply voltage that is provided to the apparatus through a single connection, wherein a charge control circuit utilizes the measurement voltage to provide a controlled charging potential that is delivered to a battery cell, the apparatus comprising:
- a means for monitoring the regulation voltage to produce a feedback voltage;
- a means for comparing produces a control signal in response to a comparison between the feedback voltage to a reference voltage;
- a means for regulating the regulation voltage in response to the control signal; and
- a means for measuring produces the measurement voltage in response to a voltage at the single connection and the regulation voltage such that the unregulated power supply voltage can be determined from the measurement voltage.

29. An apparatus as in claim 28, wherein the means for regulating further comprises a means for shunting current that provides regulation to the regulated power supply by shunting current from the regulated power supply in response to the control signal.

30. An apparatus as in claim 28, wherein the means for measuring is coupled to the single connection and the means for regulating is coupled to the means for measuring at an intermediate connection such that the regulated power supply corresponds to the single connection.

31. An apparatus as in claim 28, wherein the means for measuring is coupled to the single connection and the means for regulating is coupled to the means for measuring at an intermediate connection such that the regulated power supply corresponds to the intermediate connection.

32. An apparatus as in claim 28, wherein the means for measuring is coupled to the single connection and the means for regulating is also coupled to the single connection such that the regulated power supply corresponds to the single connection.

33. An apparatus as in claim 28, wherein the means for measuring is responsive to the control signal.

34. An apparatus as in claim 28, further comprising:
- a means for sensing produces a sense voltage that corresponds to the charging potential that is delivered to the battery cell; and
- a means for correcting the measurement voltage in response to the sense voltage.

* * * * *

UNITED STATES PATENT AND TRADEMARK OFFICE
CERTIFICATE OF CORRECTION

PATENT NO. : 6,504,347 B1 Page 1 of 1
DATED : January 7, 2003
INVENTOR(S) : Gregory J. Smith et al.

It is certified that error appears in the above-identified patent and that said Letters Patent is hereby corrected as shown below:

Column 15,
Line 31, after "comprising a", remove "band-gap".
Line 36, replace "input node" with -- connection point --.
Line 53, after "circuit such that the" remove "such that the".

Column 16,
Line 44, after "responsive to" add -- a control signal produced in response to --.
Line 46, replace "in response" with -- related --.

Column 17,
Line 13, replace "measurement" with -- control --.
Line 46, after "utilizes" add -- a control signal produced in response to --.

Signed and Sealed this

Twenty-fourth Day of June, 2003

JAMES E. ROGAN
*Director of the United States Patent and Trademark Office*